(12) United States Patent
Herr et al.

(10) Patent No.: US 10,349,363 B2
(45) Date of Patent: Jul. 9, 2019

(54) METHODS AND APPARATUS FOR AUTOMATIC CONFIGURATION OF A WIRELESS ACCESS POINT

(71) Applicant: Nokia Solutions and Networks Oy, Espoo (FI)

(72) Inventors: Ashley Herr, Arlington Heights, IL (US); Akila Srinivasan, Carpentersville, IL (US); John Harris, Glenview, IL (US); Jason Shy, Palatine, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 51 days.

(21) Appl. No.: 15/529,205

(22) PCT Filed: Nov. 26, 2014

(86) PCT No.: PCT/US2014/067573
§ 371 (c)(1),
(2) Date: May 24, 2017

(87) PCT Pub. No.: WO2016/085485
PCT Pub. Date: Jun. 2, 2016

(65) Prior Publication Data
US 2018/0338291 A1 Nov. 22, 2018

(51) Int. Cl.
| | |
|---|---|
| *H04W 24/02* | (2009.01) |
| *H04W 52/34* | (2009.01) |
| *H04W 52/36* | (2009.01) |
| *H04W 88/06* | (2009.01) |
| *H04W 88/10* | (2009.01) |

(52) U.S. Cl.
CPC ......... *H04W 52/367* (2013.01); *H04W 24/02* (2013.01); *H04W 88/06* (2013.01); *H04W 88/10* (2013.01); *H04W 52/343* (2013.01)

(58) Field of Classification Search
CPC .... H04W 24/02; H04W 52/376; H04W 88/10
USPC ........................................................ 455/522
See application file for complete search history.

(56) References Cited

U.S. PATENT DOCUMENTS

| | | | |
|---|---|---|---|
| 8,983,453 B1 * | 3/2015 | On ........................ | H04W 24/02 370/252 |
| 2011/0003598 A1 * | 1/2011 | Ma ..................... | H04W 72/0426 455/452.1 |
| 2012/0039265 A1 | 2/2012 | Patel et al. | |
| 2012/0046025 A1 | 2/2012 | Das et al. | |
| 2012/0307697 A1 * | 12/2012 | Mukhopadhyay .... | H04W 24/02 370/311 |

(Continued)

FOREIGN PATENT DOCUMENTS

| | | |
|---|---|---|
| JP | 2013520106 A | 5/2013 |
| JP | 2013538519 A | 10/2013 |
| WO | WO-2012/040640 A1 | 3/2012 |

*Primary Examiner* — Simon Nguyen
(74) *Attorney, Agent, or Firm* — Harrington & Smith (57) ABSTRACT

Systems and techniques for configuring a wireless base station. A wireless base station enters a configuration mode including less than full cellular functionality, receives neighboring cell information at least one neighbor cell in the vicinity of the wireless base station using communications requiring less than full cellular functionality by the wireless base station, and entering an operational mode including full cellular functionality, using a configuration based at least in part on the neighboring cell information.

7 Claims, 4 Drawing Sheets

(56) References Cited

U.S. PATENT DOCUMENTS

2013/0244653 A1     9/2013   Song et al. .................. 455/436
2017/0156068 A1*   6/2017   Frenger ................ H04W 24/02

\* cited by examiner

METHODS AND APPARATUS FOR AUTOMATIC CONFIGURATION OF A WIRELESS ACCESS POINT

FIELD OF THE INVENTION

The present invention relates generally to wireless communication. More particularly, the invention relates to improved systems and techniques for automatic configuration of a wireless communication access point.

BACKGROUND

Modern cellular communication systems are more and more turning to deployments that include the use of small cells within and overlapping the coverage area of a large cell or macro cell. A large, longer-range base station, or (in networks operating according to third generation partnership project (3GPP) and related standards) evolved NodeB (eNB), may be referred to as a macro eNB defining a macro cell. Overlying the macro cell may be a number of smaller cells defined by smaller, shorter range base stations, or eNBs. Smaller cells cover shorter ranges and the use of small cells allows for repeated use of frequencies within a large cell. In addition, small eNBs are smaller and less expensive than macro eNBs and can be relatively easily transported to a desired spot. The small size and associated transportability of small eNBs allows for considerable flexibility in configuring a network environment, because small eNBs can be added to or moved about the area of a macro cell.

In order to be deployed, a small cell needs to be configured to operate as part of a network, and configuration may usefully take into account radio conditions in the local environment in which the small cell is to be deployed. The simpler the process of deployment and configuration, the more easily small eNBs can be deployed and small cells created.

SUMMARY OF THE INVENTION

In one example of an embodiment of the invention, a method implemented by a processor at a wireless base station includes, entering a configuration mode including less than full cellular functionality, receiving neighboring cell information of at least one neighbor cell in the vicinity of the wireless base station using communications requiring less than full cellular functionality by the wireless base station, and entering an operational mode including full cellular functionality, using a configuration based at least in part on the neighboring cell information.

In another example of an embodiment of the invention, a method implemented by a processor of a wireless base station includes entering a reduced transmit power cellular mode, receiving neighboring cell information from a user equipment, in response to determining that a current configuration of the wireless base station conflicts with the neighboring cell information, reconfiguring the wireless base station based at least in part on the neighboring cell information and, in response to determining that the reconfiguring has been successful, incrementally increasing cellular transmit power.

In another example of an embodiment of the invention, a processor implemented method includes determining neighboring cell information for at least one neighbor cell of a wireless base station that is operating in a configuration mode including less than full cellular functionality, and communicating the neighboring cell information to the wireless base station using communications requiring less than full cellular functionality by the wireless base station.

In another example of an embodiment of the invention, an apparatus for use with a wireless base station includes at least one processor and memory storing a program of instructions. The memory storing the program of instructions is configured to, with the at least one processor, cause the apparatus to at least control the wireless base station to enter a configuration mode including less than full cellular functionality, receive neighboring cell information at least one neighbor cell in the vicinity of the wireless base station using communications requiring less than full cellular functionality by the wireless base station, and enter an operational mode including full cellular functionality, using a configuration based at least in part on the neighboring cell information.

In another example of an embodiment of the invention, an apparatus for use with a wireless base station includes at least one processor and memory storing a program of instructions. The memory storing the program of instructions is configured to, with the at least one processor, cause the apparatus to at least enter a reduced transmit power cellular mode, receive neighboring cell information from a user equipment, in response to determining that a current configuration of the wireless base station conflicts with the neighboring cell information, reconfigure the wireless base station based at least in part on the neighboring cell information, and, in response to determining that the reconfiguring has been successful, incrementally increase cellular transmit power.

In another example of an embodiment of the invention, an apparatus includes at least one processor and memory storing a program of instructions. The memory storing the program of instructions is configured to, with the at least one processor, cause the apparatus to at least determine neighboring cell information for at least one neighbor cell of a wireless base station that is operating in a configuration mode including less than full cellular functionality and communicate the neighboring cell information to the wireless base station using communications requiring less than full cellular functionality by the wireless base station.

In another example of an embodiment of the invention, a computer readable medium for use with a wireless base station stores a program of instructions, execution of which by at least one processor configures the wireless base station to at least enter a configuration mode including less than full cellular functionality, receive neighboring cell information at least one neighbor cell in the vicinity of the wireless base station using communications requiring less than full cellular functionality by the wireless base station, and enter an operational mode including full cellular functionality, using a configuration based at least in part on the neighboring cell information.

In another example of an embodiment of the invention, a computer readable medium for use with a wireless base station stores a program of instructions, execution of which by at least one processor configures the wireless base station to at least enter a reduced transmit power cellular mode, receive neighboring cell information from a user equipment, in response to determining that a current configuration of the wireless base station conflicts with the neighboring cell information, reconfigure the wireless base station based at least in part on the neighboring cell information, and, in response to determining that the reconfiguring has been successful, incrementally increase cellular transmit power.

In another example of an embodiment of the invention, a computer readable medium stores a program of instructions, execution of which by at least one processor configures an apparatus to at least determine neighboring cell information for at least one neighbor cell of a wireless base station that is operating in a configuration mode including less than full cellular functionality and communicate the neighboring cell information to the wireless base station using communications requiring less than full cellular functionality by the wireless base station.

DETAILED DESCRIPTION

The present description is presented in terms of third generation partnership project (3GPP) long term evolution (LTE) and 3GPP LTE-advanced (3GPP LTE-A) systems, but it will be recognized that the systems and techniques described herein may be used in any suitable environment. In order to simplify the deployment and configuration of small eNBs, one or more example embodiments of the invention provide for automated configuration of cellular functionality. Configuration may be assisted by communication with a user equipment (UE) in the vicinity, which is able to maintain a cellular connection to the network (such as through the macro eNB) and retrieve configuration parameters for the eNB that is to be deployed. As disclosed herein, in examples of embodiments a UE is a mobile computing device having wireless communication capabilities, such as for example a cellular telephone, a smartphone, a laptop computer, a palmtop computer, a tablet computer, or an Internet appliance. UEs are by no means limited to these examples, and UEs can be used to carry out a wide variety of functions, of which the examples listed here are only a selection. The UE may obtain neighboring cell information, and the UE and the small eNB may communicate with one another, suitably over a low-power cellular connection or a non-cellular connection, in order to allow the UE to provide the neighboring cell information to the small eNB without a need for the small eNB to activate its cellular function at normal operational power without first having knowledge of the environment created by its neighboring access points.

As disclosed herein, in examples of embodiments, neighboring cell information includes at least one of radio conditions the UE is experiencing, based on configuration parameters for the eNB that is to be deployed; or radio conditions in the vicinity of the eNB to be deployed, such as for example measurements of the radio conditions of neighbor cells (such as for example received power (such as for example the reference signal received power (RSRP) or the reference signal received quality (RSRQ) and frequency), configuration information for neighbor cells, or both. In example embodiments, configuration information for a neighbor cell includes at least one of: a power setting of the neighbor cell, frequencies used by the neighbor cell, scheduling configuration, physical cell identifier information, or other information. In examples of embodiments, the UE obtains neighboring cell information by making direct inquiries to neighbor cells, or by communication with one or more site manager service nodes. As disclosed herein, in example embodiments a non-cellular connection is a connection that is not a cellular connection, such as for example a Bluetooth, Wi-Fi, or near field communication (NFC) connection.

Figure 1:
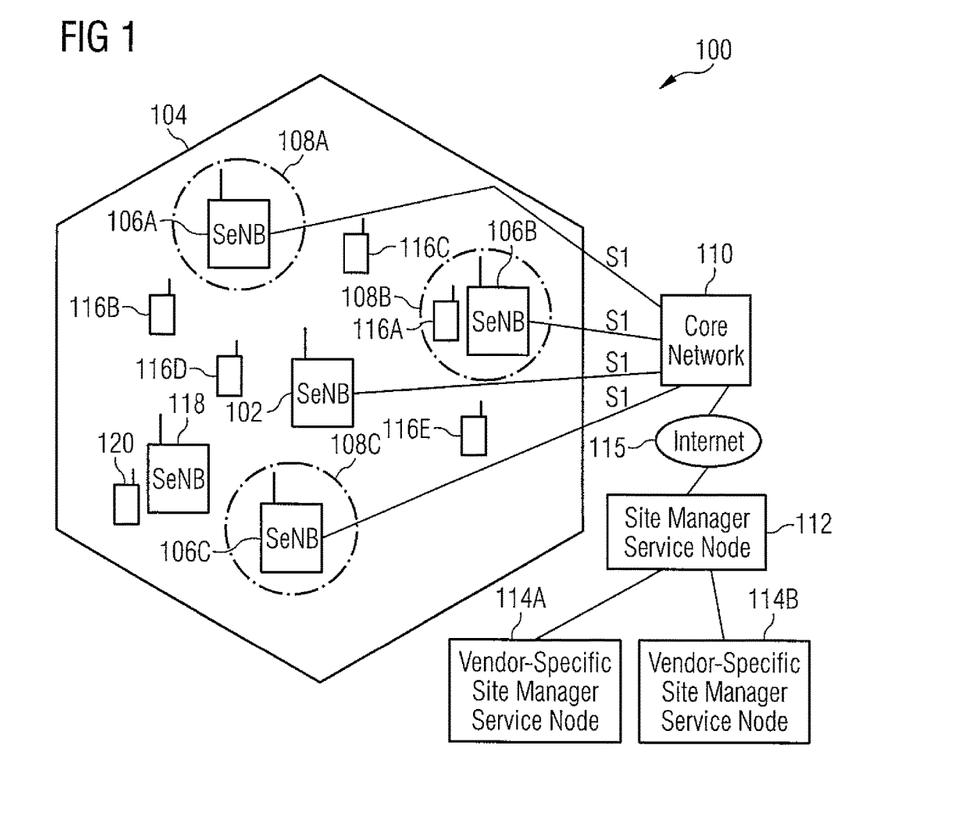
FIG. 1 illustrates a network according to an example of an embodiment of the invention.

FIG. 1 illustrates a network 100 according to one or more example embodiments of the invention. The network 100 includes a macro eNB 102 defining a macro cell 104, and a plurality of small eNBs 106A-106C, defining small cells 108A-108C, overlapping the macro cell 104. The network 100 may also include a core network 110. In addition, a site manager service node 112 and one or more vendor-specific site manager service nodes 114A and 114B may be accessible to or through the network 100, such as through a connection through the Internet 115 to the network 100. UEs may therefore be able to communicate with the site manager 112 and the vendor-specific site managers to obtain information relating to the configuration of an eNB that is to be deployed or reconfigured.

In one or more example embodiments of the invention, one or more UEs may take measurements from base stations in their vicinity, such as the small cells 108A-108C. The UE may be configured to provide neighboring cell information to an eNB being newly configured or reconfigured to operate in a network such as the network 100.

In the present example, then, UEs 116A-116E may be deployed throughout the macro cell 104, each having a connection to the macro cell and one or more having connections to the small cells 108A-108C.

A new small eNB 118 may be added to the network 100, with the operator desiring that it be configured to operate in coordination with, or at least without interfering with, the macro eNB 102, and that it operate without undue interference with or from the other small eNBs. In one or more example embodiments, mechanisms are provided that allow the eNB 118 to receive neighboring cell information relating to the neighbor cells (for example, the cells 108A-108C. Such mechanisms allow the eNB 118 to obtain such information through communication with one or more UEs, with such communication being accomplished without full-power cellular communication. The eNB 118 may therefore support a configuration mode that provides for a reduced transmit power cellular operation, and, alternatively or in addition, non-cellular operation. The eNB 118 may thus establish a connection which is unlikely to cause or to suffer from interference—for example, a low-power, short-range cellular connection, or a non-cellular connection. The one or more UEs with which the eNB 118 connects may obtain neighboring cell information relating to the radio conditions in the vicinity of the eNB 118, such as for example measurements of the neighboring cells 108A-108C, configuration information for these cells, or both. The one or more UEs may deliver this information to the eNB 118 and the eNB may be configured (suitably through automatic self-configuration) using information relating to the radio conditions in its vicinity and may do this without at any point operating in a full-power cellular mode while ignorant of these radio conditions or needing to directly listen to neighbor cells.

In the present example, in addition to the UEs 116A-116E which may be presumed to be used by unknown users of the network 100, a UE 120 may also be present in the network. The UE 120 may be operated by an installer of the eNB 118. Unlike the UEs 116A-116E, which may be operated at unpredictable times and in unpredictable locations, the UE 120 can be expected to be deliberately operated so as to assist in the installation and configuration of the eNB 118. UEs such as the UEs 116A-116E may be capable of assisting in the installation and configuration of an eNB such as the eNB 118. A UE 120 is specifically discussed here as a UE which is known to be configured to assist in initial configuration or reconfiguration and is known to be in the vicinity of a specific UE being initially or reconfigured. In the case of an initial configuration or other configuration performed by an operator, the UE 120 is known to be available for operation by the operator.

The UE 120 (as well as one or more of the other UEs) may employ applications specifically designed to assist the eNB 118, or other eNBs needing similar services. Depending on design and configuration of an application, an application may present a user interface to allow the user to configure operation, or may simply reside in the background and communicate with an eNB such as the eNB 118, and other devices, in ways transparent to the user. In one or more example embodiments of the invention, a UE such as the UE 120 may employ one or more of a number of available applications for base station configuration, with each application being compatible with base stations provided by a particular vendor and, in one or more example embodiments of the invention, with one or more applications providing for communication with configuration service elements provided by a particular vendor.

Suitably, the UE 120 is able to establish a cellular connection with the eNB 118 when at sufficiently close range, or to communicate using non-cellular functions such as Bluetooth or near field communication (NFC). The UE 120 (and other appropriately configured UEs) is able to receive direction from the eNB 118 to obtain neighboring cell information of neighbor eNBs.

Figure 2:
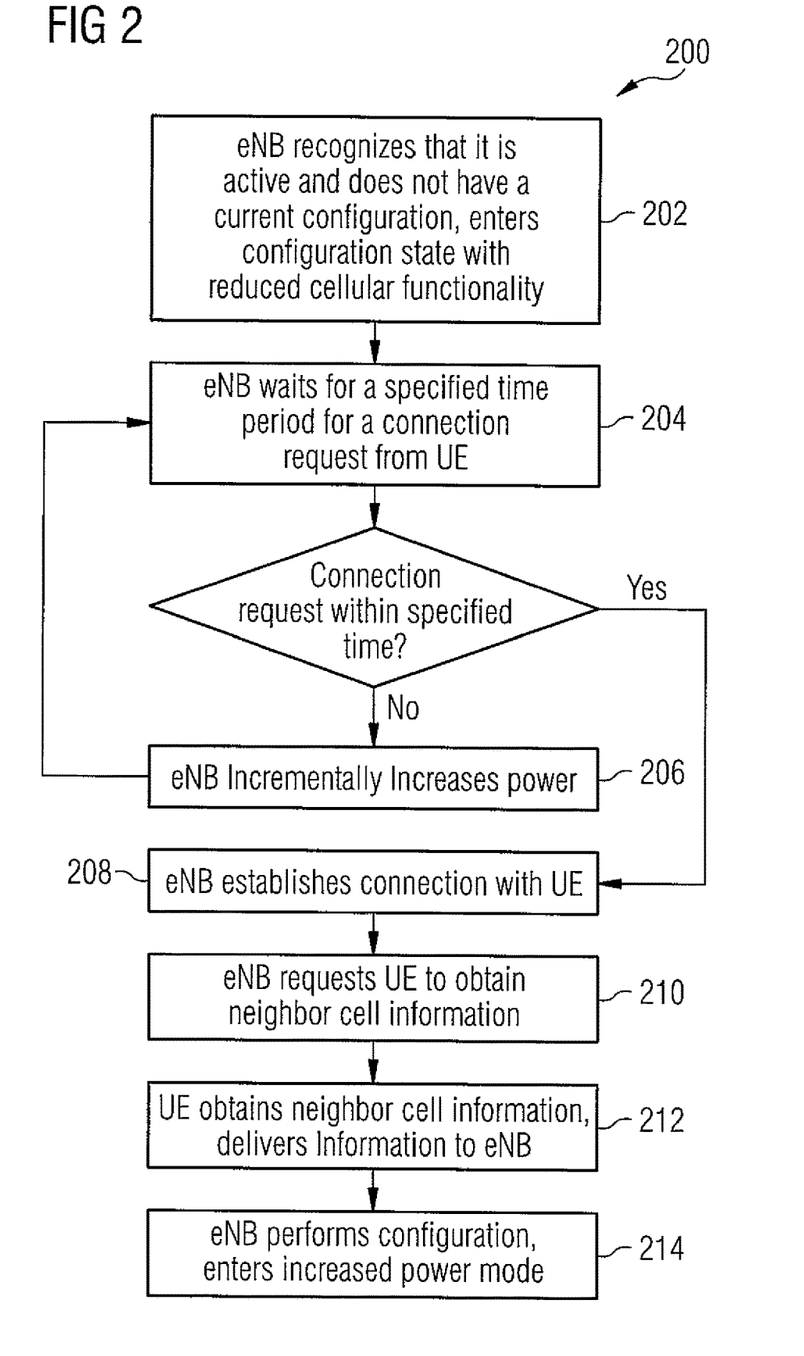
FIG. 2 illustrates a process according to an example of an embodiment of the invention.

FIG. 2 illustrates a process 200 according to an example embodiment of the invention. At block 202, in response to recognition by an eNB that it is active and does not have a current configuration, the eNB enters a configuration mode. The configuration made may be a response to a recognition that the eNB has not been configured and is being newly deployed, or may be a response to recognition that its current configuration is incompatible with its environment. In the configuration mode, cellular functionality of the eNB is reduced by setting the cellular transmit power to a reduced power (for example, to a minimum transmit power) and non-cellular functions may be activated. At block 204, the eNB waits for a connection request from a UE for a specified time period. If there is no connection request from a UE, the process proceeds to block 206 and the eNB incrementally increases power. The process then returns to block 204. The incremental power increase and return may continue until a specified maximum power level is reached.

If the eNB detects a connection request from a UE within the specified time period, the process proceeds to block 208. At block 208, the eNB establishes a connection with the UE. The connection may be a cellular connection by a UE within range of the eNB as it operates in the lower cellular functionality mode. In one or more alternative or additional example embodiments of the invention, the connection may be a non-cellular connection, such as for example Bluetooth, Wi-Fi, or near field communication.

At block 210, the eNB requests the UE to obtain neighboring cell information, and at block 212, the UE obtains the neighboring cell information. The UE then delivers neighboring cell information to the eNB. At block 214, the eNB configures itself (such as for example selecting frequencies to be used, average and peak transmit power, and scheduling), and enters an increased power mode. In one or more example embodiments, the increase in power may be incremental.

Figure 3:
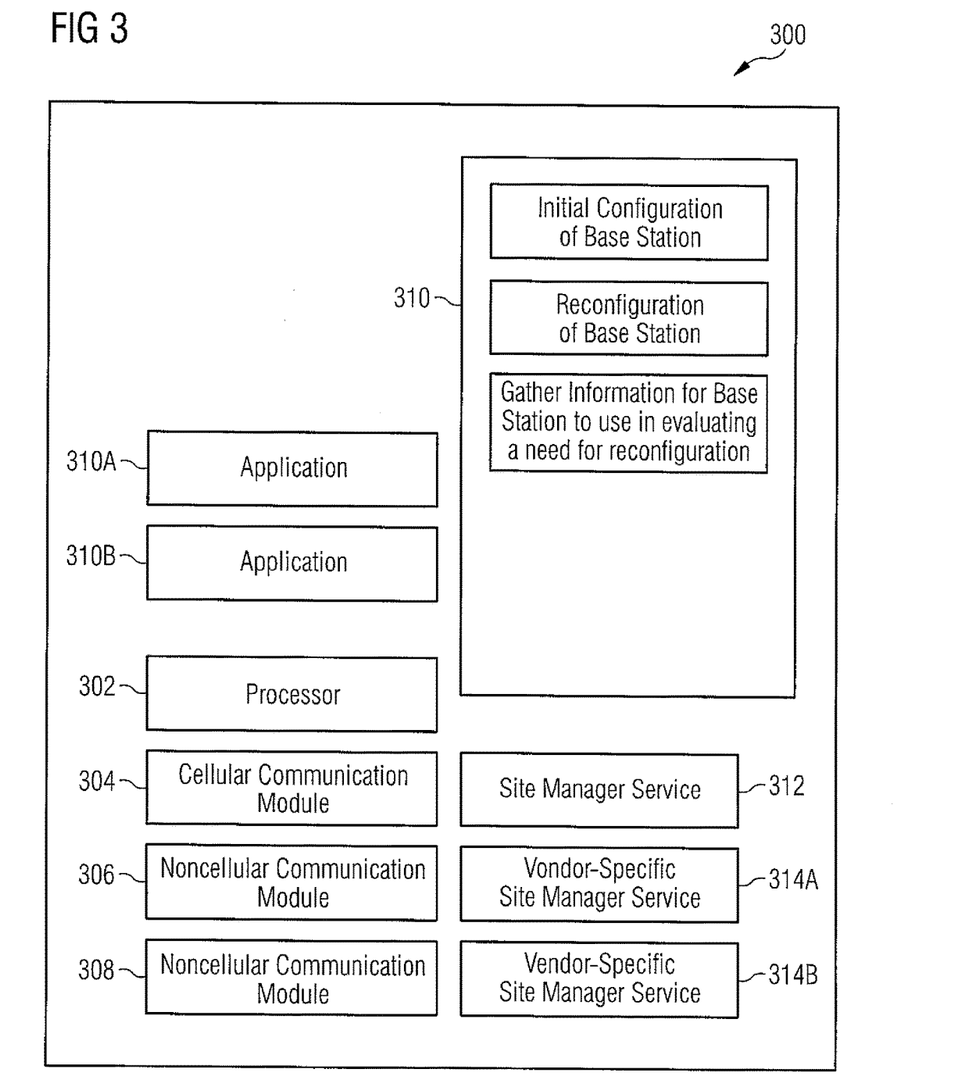
FIG. 3 illustrates a user device according to an example of an embodiment of the invention.

FIG. 3 illustrates additional details of a user equipment (UE) 300 according to one or more example embodiments of the invention. The UE 300 may have installed applications providing the capability of communicating with an eNB undergoing initial configuration or reconfiguration, taking measurements, communicating with eNBs to determine their configuration, and communicating with monitoring service elements. The UE 300 may suitably include a processor 302, a cellular communication module 304, and a non-cellular communication module 306. The UE 300 may implement a plurality of applications, which may be typical smartphone applications downloadable from a central repository or "store." Each of one or more applications may be developed by or on behalf of a base station vendor for its base stations, and may be adapted to control the UE to communicate with a base station using a low-power cellular connection or a non-cellular connection, and obtain neighboring cell information needed by the base station for its configuration and deliver the information to the base station. The UE 300 may support various applications and services—for example, applications 310A and 310B furnished by base station vendors A and B, respectively, a site manager service 312, interacting with vendor-specific site manager services 314A and 314B, adapted to base stations furnished by vendors A and B, respectively. The vendor-specific site manager services may control the UE's communication with base stations provided by the vendor in order to receive configuration information requests and furnish information to the base stations, suitably through communication with one or more site manager service nodes and vendor-specific site manager service nodes.

The UE 300 may also support a radio frequency neighbor monitoring service, controlling the UE's measurements of neighbor cell radio conditions. Applications such as the application 310A and 310B may provide a user interface 320 to allow user selections—to select, for example, initial configuration, reconfiguration, or gathering neighboring cell information that the base station may use in determining if a reconfiguration is needed. In one or more example embodiments of the invention, the UE 300 may provide mechanisms to bind applications and services together through what is called an intent mechanism. An intent mechanism allows for one application or service to select and run another application or service. The selection may be a selection of a specified application or service, in which case the intent mechanism is referred to as an explicit intent mechanism. In other cases, the selection may be a selection of an application or service based on recognition of a particular need and selection of an application or service meeting that need. In one example, the radio conditions monitor application might determine the location of the UE 300 and then select a location-based database of known cell sites in order to help determine which cells were neighbor cells of the eNB that is being configured or reconfigured.

Figure 4:
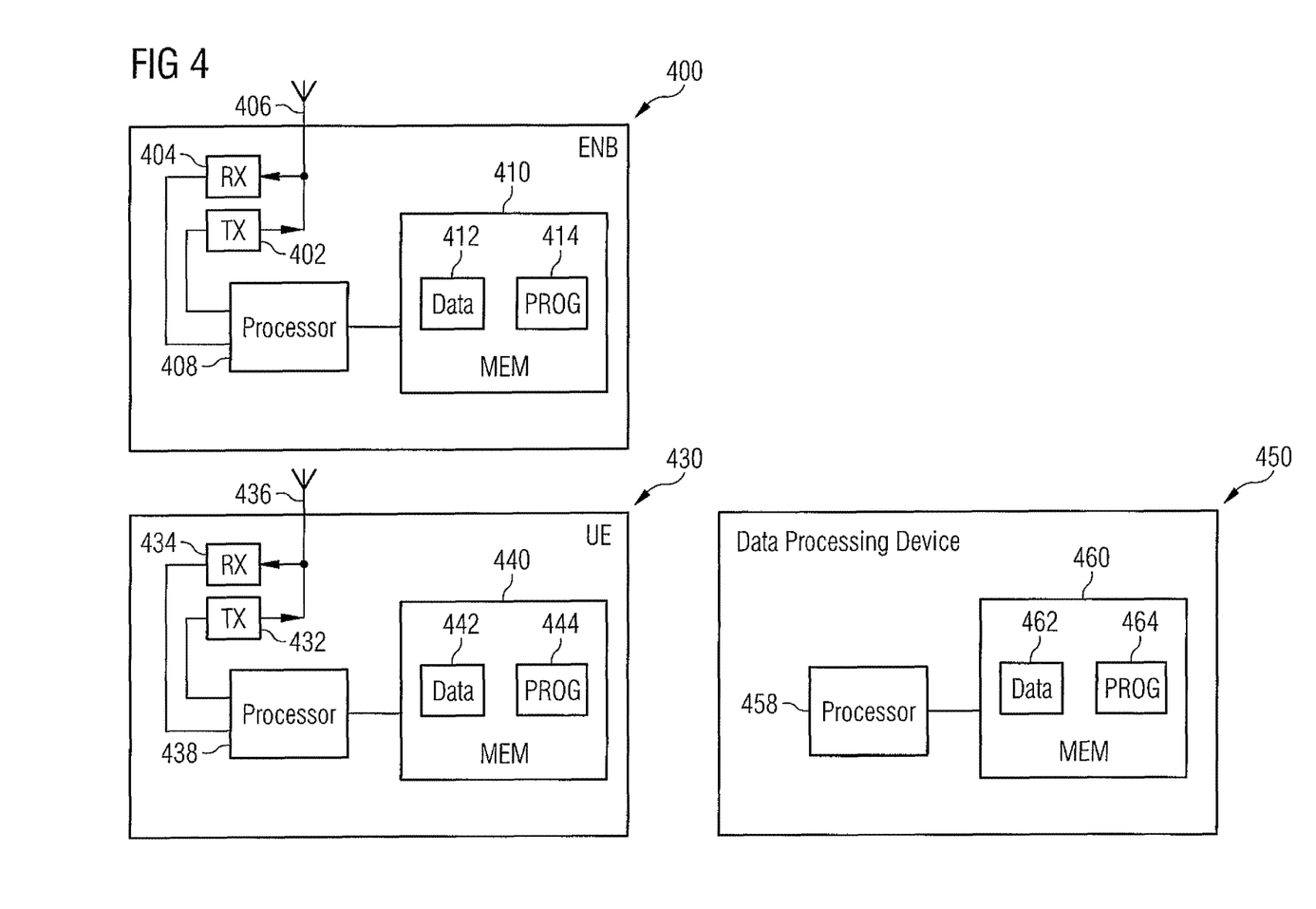
FIG. 4 illustrates elements that can be used to carry out examples of embodiments of the invention.

FIG. 4 presents details of an eNB 400, a user equipment (UE) 430, and a data processing device 450 suitable for carrying out one or more example embodiments of the invention. ENBs similar to the UE 400 may be implemented as, for example, the eNB 102, the eNBs 106A-106C, or the eNB 118 of FIG. 1. The eNB 400 may suitably include a transmitter 402, receiver 404, and antenna 406. The eNB 400 may also include a processor 408 and memory 410. The eNB 400 may employ data 412 and programs (PROGs) 414, residing in memory 410.

UEs similar to the UE 430 may be implemented as, for example, the UEs 116A-116E and the UE 120. The UE 430 suitably includes a transmitter 432, receiver 434, and antenna 436. The UE 430 may also include a processor 438 and memory 440. The UE 430 may employ data 442 and programs (PROGs) 444, residing in the memory 440.

Data processing devices similar to the data processing device 450 may be implemented as, for example, the core network 111, the site manager service node 112, and the vendor-specific site manager service nodes 114A and 114B. The data processing device may suitably a processor 458 and memory 460. The data processing device 430 may employ data 462 and programs (PROGs) 464, residing in the memory 460.

At least one of the PROGs 414 in the eNB 400 suitably includes a set of program instructions that, when executed by the associated processor 408, enable the device to operate in accordance with example embodiments of this invention. In these regards, example embodiments of this invention may be implemented at least in part by computer software stored on the MEM 410, which is executable by the processor 408 of the eNB 400, or by hardware, or by a combination of tangibly stored software and hardware (and tangibly stored firmware). Similarly, at least one of the PROGs 444 in the UE 430 is assumed to include a set of program instructions that, when executed by the associated processor 438, enable the device to operate in accordance with the example embodiments of this invention, as detailed above. In these regards, example embodiments of this invention may be implemented at least in part by computer software stored on the MEM 440, which is executable by the processor 438 of the UE 430, or by hardware, or by a combination of tangibly stored software and hardware (and tangibly stored firmware). Similarly, at least one of the PROGs 464 in the data processing device 450 is assumed to include a set of program instructions that, when executed by the associated processor 458, enable the device to operate in accordance with the example embodiments of this invention, as detailed above. In these regards, example embodiments of this invention may be implemented at least in part by computer software stored on the MEM 460, which is executable by the processor 458 of the data processing device 450, or by hardware, or by a combination of tangibly stored software and hardware (and tangibly stored firmware). Electronic devices implementing these aspects of the invention need not be the entire devices as depicted at FIG. 1 or FIG. 4 or may be one or more components of same such as the above described tangibly stored software, hardware, firmware and processor, or a system on a chip (SOC) or an application specific integrated circuit (ASIC).

Various examples of embodiments of the computer readable MEM 410, 440, and 460 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various example embodiments of the processors 408, 438, and 458 include but are not limited to general purpose computers, special purpose computers, microprocessors, digital signal processors (DSPs) and multi-core processors.

Various modifications and adaptations to the foregoing examples of embodiments of this invention may become apparent to those skilled in the relevant arts in view of the foregoing description. While various example embodiments have been described above it should be appreciated that the practice of the invention is not limited to the example embodiments shown and discussed here.

Further, some of the various features of the above non-limiting examples of embodiments may be used to advantage without the corresponding use of other described features. The foregoing description should therefore be considered as merely illustrative of the principles, teachings and examples of embodiments of this invention, and not in limitation thereof.

We claim:

1. A method implemented by a processor of a wireless base station, comprising:
    entering a reduced transmit power cellular mode;
    receiving neighboring cell information from a user equipment;
    in response to determining that a current configuration of the wireless base station conflicts with the neighboring cell information, reconfiguring the wireless base station based at least in part on the neighboring cell information; and
    in response to determining that the reconfiguring has been successful, incrementally increasing cellular transmit power.

2. The method of claim 1, wherein the reduced transmit power cellular mode is a minimum transmit power cellular mode.

3. The method of claim 1, wherein the reduced transmit power cellular mode is a greater than minimum transmit power, but less than normal operational transmit power, cellular mode.

4. The method of claim 1, wherein the wireless base station is controlled to communicate with the user equipment over a non-cellular connection.

5. An apparatus for use with a wireless base station, comprising:
    at least one processor;
    memory storing a program of instructions;
    wherein the memory storing the program of instructions is configured to, with the at least one processor, cause the apparatus to at least:
    control the wireless base station to enter a reduced transmit power cellular mode;
    cause the wireless base station to receive neighboring cell information from a user equipment;
    in response to determining that a current configuration of the wireless base station conflicts with the neighboring cell information, reconfigure the wireless base station based at least in part on the neighboring cell information; and
    in response to determining that the reconfiguring has been successful, control the wireless base station to incrementally increase cellular transmit power.

6. The apparatus of claim 5, wherein the reduced transmit power cellular mode is a minimum transmit power cellular mode.

7. A computer program product embodied on a non-transitory computer-readable medium in which a computer program is stored that, when being executed by a computer, is configured to provide instructions to control a base station in wireless communications system to at least:
    enter a reduced transmit power cellular mode;
    receive neighboring cell information from a user equipment;
    in response to determining that a current configuration of the wireless base station conflicts with the neighboring cell information, reconfigure the wireless base station based at least in part on the neighboring cell information; and in response to determining that the reconfiguration has been successful, incrementally increasing cellular transmit power.

* * * * *